Figure 1:
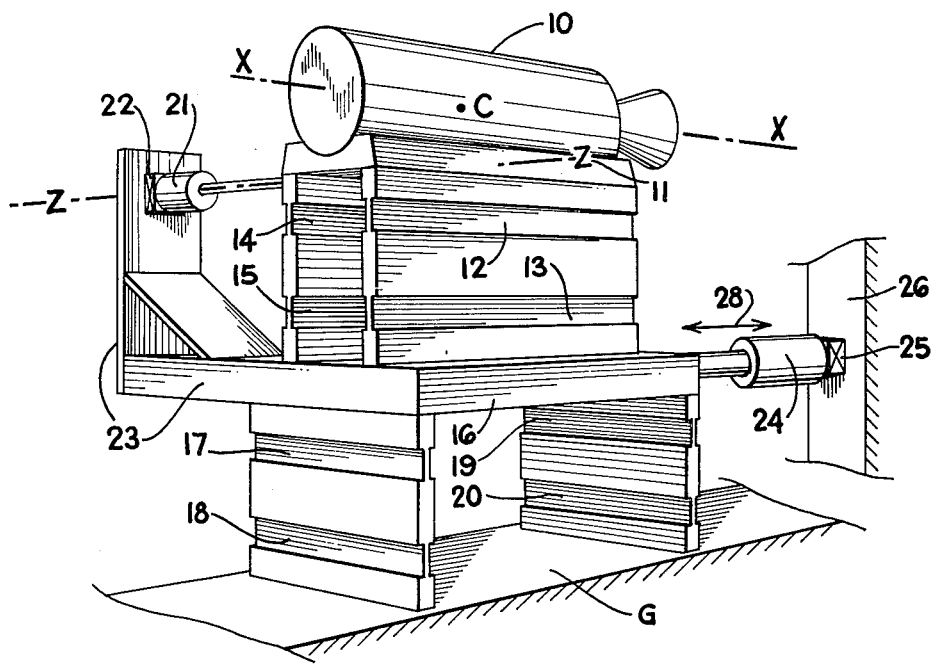

INVENTOR.
ALFRED N. ORMOND
BY Elliott & Pastoriza
ATTORNEYS 3,138,953
LOW INTERACTION TEST STAND
Alfred N. Ormond, 11969 Riviera Road,
Santa Fe Springs, Calif.
Filed Sept. 21, 1961, Ser. No. 139,699
4 Claims. (Cl. 73—116)

This invention relates generally to test stands for rocket engines and more particularly to an improved low interaction test stand particularly designed for measuring side forces exerted by a rocket engine.

In missile development and testing, it is often desirable to measure side components of force to a high degree of accuracy. For example, small jets for maneuvering a missile body in space all have force components normal to the main thrust axis of the missile and in such installations, accurate measurements of these components are essential.

The conventional multi-component test stand cannot be effectively used for the foregoing purpose principally because the main thrust forces of the missile engine are so large that errors introduced as a consequence of misalignment, for example, are often of the same order of magnitude as the actual side components to be measured. In fact, the complexities involved in proper alignment of the missile in a standard or conventional type multi-component test stand prevent the practical measurements of side or normal forces with accuracies better than .3 percent of the principal thrust force or load. In many instances, this amounts to an error of 3 percent or greater in the measurement of the side forces.

With the foregoing in mind, it is a primary object of this invention to provide a novel low interaction test stand capable of measuring side forces to an extremely high degree of accuracy of the order of fractions of 1 percent.

Another object is to provide a low interaction test stand in which the principal thrust of a rocket engine may be measured at the same time measurement of a side load or force is taken with a minimum of interaction between the two measurements.

A more general object of this invention is to provide a low interaction test stand in which errors resulting from alignment problems are substantially eliminated to the end that more accurate side force measurements can be taken than has been possible heretofore.

Briefly, these and other objects and advantages of this invention are attained by providing a bed for supporting a rocket engine to be tested. Disposed below the bed in spaced parallel relationship thereto is a table. Between the bed and table are provided flexure means including flexure webs having their bending axes running parallel to the main thrust axis of the missile. Preferably, these flexure webs extend vertically between the upper and lower opposite longitudinal edges of the bed and table respectively so that the webs themselves lie in parallel planes. With this arrangement, the rocket engine is constrained to movement only in horizontal side directions normal to the main thrust axis. The flexure means themselves will absorb shear, yaw, and roll force components as a consequence of misalignment of the main thrust forces.

In a preferred embodiment of the invention, the table itself is mounted on flexure means including flexure webs having bending axes extending normal to the main thrust axis. With this arrangement, the table is constrained to movement only in the direction of the main thrust axis of the missile.

Side force measurements are effected by means of a load cell disposed between a lateral support means extending from the table so that side movements of the missile relative to the table are measured. The principal thrust force itself may be simultaneously measured by positioning of a thrust load cell between the table and an exterior stationary structure.

Figure 2:
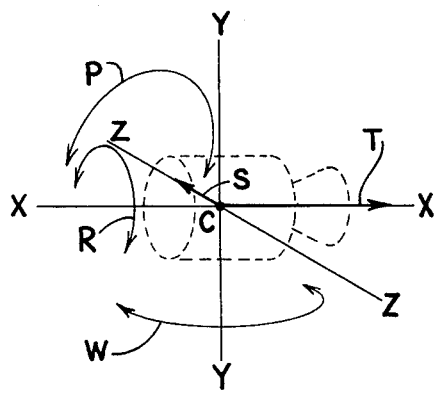

A better understanding of the invention will be had by referring to a preferred embodiment thereof as schematically illustrated in the accompanying drawings, in which:

FIGURE 1 is a perspective view illustrating the low interaction test stand of this invention; and, FIGURE 2 illustrates various interacting forces which are isolated from each other by the test stand.

Referring first to FIGURE 1, there is shown a rocket engine 10 having a longitudinal thrust axis X—X. As shown, the engine 10 is supported on an elongated bed 11. First and second flexure means including upper and lower flexure webs 12, 13, and 14, 15 have their upper edges secured respectively to opposite longitudinal sides of the bed 11. These flexure means extend downwardly and have their lower ends secured to opposite sides of an elongated table 16. The flexure webs 12, 13 and 14, 15 lie in first parallel vertical planes. The bending axes of each of these flexure webs are thus parallel to the thrust axis X—X of the engine 10. By this arrangement, the missile is constrained to movement relative to the table 16 only in a horizontal side direction normal to the axis X—X.

In accordance with the preferred embodiment of the test stand, the table 16 itself is supported by third and fourth flexure means comprising upper and lower flexure webs 17 and 18 secured to the front of the table 16 at their upper ends and upper and lower flexure webs 19 and 20 secured to the rear of the table 16. The lower ends of these flexures in turn are secured to a stationary structure or ground G. The bending axes for the flexure webs 17, 18, 19, and 20 are all parallel to each other and extend in a horizontal direction normal to the thrust axis X—X. With this arrangement, the table 16 itself is constrained to movement only in a direction parallel to the thrust axis X—X.

To measure side forces of the rocket engine 10, there may be provided a conventional load cell 21 having its load axis Z extending horizontally in a direction normal to the thrust axis X—X. This load cell is supported by an end flexure 22 to a laterally extending support means 23 secured to the table 16 as shown. With this arrangement, the load cell 21 will only measure side movements of the rocket engine 10.

The main thrust of the rocket engine 10 is measured by a thrust load cell 24 having its load axis parallel to the thrust axis of the engine 10. As shown, this load cell is connected between the table 16 and end flexure 25 to a stationary structure 26. The double-headed arrows 27 and 28 designate, respectively, the directions of forces measured by the load cells 21 and 24.

FIGURE 2 illustrates some of the generated forces involved in the test stand of FIGURE 1. Thus, directed along the X—X axis is the main thrust force T provided by the principal thrust of the missile itself. The side force which it is desired to measure by means of the present test stand is designated by the smaller vector S extending in the direction of the horizontal axis Z—Z which is normal to the axis X—X. Components of force which it is not desired to measure and which are absorbed by the flexure means employed for supporting the bed and table are indicated by the vectors P, W, and R. The vector P represents a pitching moment which may result from misalignment of the main thrust. This pitching moment is wholly absorbed by the flexures 12, 13, 14, and 15 in FIGURE 1, these flexures resisting the resulting establishment of shear forces therein because of their elongated construction.

The yaw forces designated W may also arise from thrust misalignment of the main thrust vector T. These forces are absorbed by the securement of the flexures along their upper and lower edges to the corresponding opposite sides of the bed 11 and table 16 and the rigidity of the bed and table. Any roll forces R are absorbed by a compression or tension force in the flexures 14, 15, and 12, 13.

The third and fourth flexures comprising the webs 17, 18, and 19, 20 similarly function to absorb all undesirable force components. Accordingly, it is evident that only the main thrust force T and the side force S will be measured by the respective load cells and the interaction between these two forces will be substantially negligible. There is thus provided a test stand free from interaction so that the side forces can be measured with a high degree of accuracy.

From the foregoing description, it is evident that the present invention has provided a unique low interaction test stand in which sides forces alone or both side forces and thrust forces may be measured simultaneously.

While only one particular embodiment of the invention has been shown and described, various modifications that fall clearly within the scope and spirit of this invention may be effected by those skilled in the art. The low interaction test stand is therefore not to be thought of as limited to the exact embodiment set forth merely for illustrative purposes.

What is claimed is:

1. A low inter-action test stand for measuring both side and thrust forces exerted by a rocket engine, comprising, in combination: an elongated bed for supporting said engine; an elongated table disposed beneath said bed in spaced parallel relationship therewith; a stationary structure disposed below said table; first and second elongated flexure means lying in first vertical parallel planes having their bending axes parallel to said thrust axis and connected along their upper edges to opposite longitudinal sides of said bed and along their lower edges to opposite longitudinal sides of said table; third and fourth flexure means lying in second parallel vertical planes normal to said first vertical planes having their bending axes normal to said thrust axis and connected along their upper edges to the front and rear of said table and along their lower edges to said stationary structure, whereby said engine is constrained to movement relative to said table only in horizontal directions normal to said thrust axis and whereby said table is constrained to movement relative to said stationary structure only in horizontal directions parallel to said thrust axis.

2. A test stand according to claim 1, in which said table includes laterally extending support means rigidly secured thereto for supporting a load cell with its load axis normal to said thrust axis to measure said movement normal to said thrust axis.

3. A test stand for measuring both side and thrust forces exerted by a rocket engine, comprising: a bed for supporting said engine; a table disposed beneath said bed; flexure means connected between said bed and table and including at least one elongated flexure web having its bending axis parallel to the thrust axis of said engine so that said engine is constrained against movement relative to said table in the direction of said thrust axis; a stationary structure disposed beneath said table; and flexure means connected between said table and stationary structure and including at least two elongated flexure webs in spaced parallel vertical planes adjacent the fore and aft ends of said table and normal to said thrust axis of said engine so that said table is constrained to movement only in directions parallel to said thrust axis.

4. A stand according to claim 3, in which said table includes laterally extending support means for supporting a load cell to measure said movement relative to said table.

References Cited in the file of this patent

UNITED STATES PATENTS 3,038,331     Henry et al. _____ June 12, 1962

OTHER REFERENCES

Brochure: "The Design of High-Accuracy Rocket Thrust Stands and Calibrators," Daystrom Wiancko Engineering Co., October 1960.